(12) United States Patent
Godsk (10) Patent No.: US 9,200,614 B2
(45) Date of Patent: Dec. 1, 2015

(54) WIND TURBINE AND A BLADE FOR A WIND TURBINE

(75) Inventor: Kristian Balschmidt Godsk, Ry (DK)

(73) Assignee: Vestas Wind Systems A/S, Aarhus N. (DK)

( * ) Notice: Subject to any disclaimer, the term of this patent is extended or adjusted under 35 U.S.C. 154(b) by 891 days.

(21) Appl. No.: 13/321,455

(22) PCT Filed: May 19, 2010

(86) PCT No.: PCT/EP2010/056925
§ 371 (c)(1),
(2), (4) Date: Jan. 17, 2012

(87) PCT Pub. No.: WO2010/133649
PCT Pub. Date: Nov. 25, 2010

(65) Prior Publication Data
US 2012/0107117 A1 May 3, 2012

Related U.S. Application Data

(60) Provisional application No. 61/179,534, filed on May 19, 2009.

(30) Foreign Application Priority Data

May 19, 2009 (DK) .................................. 2009 70008

(51) Int. Cl.
*F03D 1/06* (2006.01)

(52) U.S. Cl.
CPC ............... *F03D 1/0608* (2013.01); *F03D 1/06* (2013.01); *F03D 1/0658* (2013.01); *F05B 2240/202* (2013.01); *F05B 2240/301* (2013.01); *Y02E 10/721* (2013.01)

(58) Field of Classification Search
CPC ... F03D 1/0641; F03D 1/0683; F03D 7/0224; F03D 7/0228; F03D 7/0232; F03D 7/0252; F03D 7/0256; F03D 7/0264; F03D 7/0268; F03D 1/0608; F03D 1/06; F03D 1/0658; F05B 2270/328
USPC ............ 416/23, 131, 132 R, 132 B, 141, 142, 416/147, 169 R, 231 R, 231 B
See application file for complete search history.

(56) References Cited

U.S. PATENT DOCUMENTS 2,622,686 A * 12/1952 Chevreau et al. ............... 416/23
4,840,540 A 6/1989 Kallergis
(Continued)

FOREIGN PATENT DOCUMENTS

CA 2793780 A1 12/2003
CA 2 425 447 10/2004
(Continued)

OTHER PUBLICATIONS

Sanne H. Skovborg; 1st Technical Examination and Search Report issued in priority Denmark Application No. PA 2009 70008; Dec. 8, 2009; 5 pages; Denmark Patent and Trademark Office.
(Continued)

*Primary Examiner* — Dwayne J White
*Assistant Examiner* — Adam W Brown
(74) *Attorney, Agent, or Firm* — Wood, Herron & Evans, LLP (57) ABSTRACT

A wind turbine with a rotor mounted on a hub section, wherein the rotor comprises a plurality of blades, at least one of which comprises a main blade section, which is optionally pitchable, and an auxiliary blade section mounted to the hub section. The auxiliary blade section is arranged in the area of a leading edge or of a trailing edge of the main blade, so that each blade is thereby provided with a leading edge slat or a trailing edge flap formed by the auxiliary blade section to increase the planform area of the blade and increase aerodynamic lift. A control method for a wind turbine controls a main blade section and an auxiliary blade section to provide different angles of attack to reduce undesired loads at sudden extreme changes of wind speed, e.g. during idling of the wind turbine. In a separate aspect, the invention provides a wind turbine having a blade with a non-pitchable leading edge slat, which extends at most 40% of the radius of the rotor in a longitudinal direction of the blade.

28 Claims, 4 Drawing Sheets

(56) References Cited

U.S. PATENT DOCUMENTS

| | | | |
|---|---|---|---|
| 5,096,378 A * | 3/1992 | Jamieson | 416/23 |
| 5,527,152 A * | 6/1996 | Coleman et al. | 416/23 |
| 6,840,741 B1 | 1/2005 | Wake et al. | |
| 7,381,029 B2 * | 6/2008 | Moroz | 416/132 B |
| 7,837,442 B2 * | 11/2010 | Kirtley et al. | 416/132 B |
| 2008/0240923 A1 * | 10/2008 | Bonnet | 416/223 R |
| 2009/0081047 A1 | 3/2009 | Koike | |
| 2011/0142636 A1 * | 6/2011 | Curtin | F03D 1/0658 416/62 |

FOREIGN PATENT DOCUMENTS

| | | |
|---|---|---|
| DE | 483057 C | 9/1929 |
| DE | 10307682 A1 | 1/2004 |
| EP | 2 107 235 | 7/2009 |
| GB | 264 511 | 7/1927 |
| JP | 56-138465 | 10/1981 |
| JP | 57-146066 A1 | 9/1982 |
| JP | 61-167175 | 7/1986 |
| WO | 2007/045244 | 4/2007 |
| WO | 2007/057021 | 5/2007 |
| WO | 2007057021 A1 | 5/2007 |
| WO | 2007/105174 | 9/2007 |
| WO | WO 2007105174 A1 * | 9/2007 |
| WO | 2009/146810 | 12/2009 |

OTHER PUBLICATIONS

Pavlos Avramidis; International Search Report and Written Opinion issued in priority International Application No. PCT/EP2010/056925; Feb. 17, 2011; 12 pages; European Patent Office.

Pavlos Avramidis; International Preliminary Report on Patentability issued in priority International Application No. PCT/EP2010/056925; Oct. 5, 2011; 11 pages; European Patent Office.

European Patent Office, Notice of Opposition issued in corresponding German Application No. 10720916.5, dated Jul. 2, 2014, 26 pages.

* cited by examiner

Fig. 8

Fig. 9

WIND TURBINE AND A BLADE FOR A WIND TURBINE

TECHNICAL FIELD

The invention relates to a wind turbine comprising a rotor with at least one blade, and to a blade for such a wind turbine. More specifically, the invention relates to improvements with respect to auxiliary blade portions, such as leading edge slats and/or trailing edge flaps for increasing lift.

BACKGROUND OF THE INVENTION

There is a general desire for wind turbine rotors to produce as much energy as possible for a given wind speed. However, the inner part of a wind rotor blade has to meet constraints related to structure, manufacturing and transport, which counteract measures for optimizing lift. The structural constraints include that the thickness of the wind turbine blade must increase towards a root section thereof.

The rpm of wind turbine rotors, their power output and load on the wind turbine blades is commonly conducted by controlling the pitch of the blades, i.e. the level of twisting of the blades into the wind. Generally, a decreasing pitch angle increases the load on the blades of the wind turbine rotor and hence the amount of energy that can be extracted from the wind at a given wind velocity. However, the pitch needs to be kept within limits in order to avoid aerodynamic stall or overload on the blades. In order to optimize power output, most modern wind turbines are equipped with pitch control systems for controlling the pitch angles of the blades based on measured or estimated parameters, such as output power.

One concern in the design of wind turbines is to safeguard components, which are subject to forces and torques, against overload occurring, for example, at extreme wind conditions, at the occurrence of gusts, or at sudden wind direction changes.

SUMMARY OF THE INVENTION

It is an object of embodiments of the invention to provide improvements to the configuration of wind turbines and wind turbine blades to increase power output. Embodiments of the invention are notably concerned with increasing lift on the blades near the root, i.e. near the hub section of the blades. More specifically, it is an object of embodiments of the invention to increase the chord and/or planform area of wind turbine blades in a way that avoids collision between the blades and the tower, even in respect of pitch-controlled wind turbines. It is a further object of embodiments of the invention to ease transport of the blades. It is a further object of embodiments of the invention to provide a wind turbine control, which reduces the risk of mechanical overload at sudden extreme wind direction changes.

In a first aspect, the invention provides a wind turbine with a rotor mounted on a hub section, the rotor comprising a plurality of blades and being rotatable around a main axis of the wind turbine, wherein the hub section is rotatable around a hub axis in fixed co-axial alignment with the main axis of the wind turbine, at least one of the blades of the rotor, preferably each of the blades of the rotor, comprising:

a main blade section, which is arranged to be driven by wind to rotate around the main axis, the main blade section being optionally pitchable;

an auxiliary blade section mounted to the hub section and arranged to be driven by wind to rotate around the main axis;

wherein the auxiliary blade section is arranged in the area of a leading edge or of a trailing edge of the main blade, so that each blade is thereby provided with a leading edge slat and/or a trailing edge flap formed by the auxiliary blade section to increase the planform area of the blade and increase aerodynamic lift.

Thanks to the auxiliary blade section, the planform area of the blade is increased to increase lift. In order to avoid that a root/hub portion of the main blade section and/or of the auxiliary blade section collides with the tower during operation of the blade in a pitched stated, the auxiliary blade section is preferably separately mounted to the hub, so that it can be pitched independently of the main blade, or mounted in a fixed non-pitchable way. Alternatively, the main blade while having a reduced chord due to the auxiliary blade section(s) may be pitched independently of the auxiliary blade section(s) and avoid tower collision. Also, the reduced chord of the main blade enables easier transport, as the auxiliary blade section(s) may be transported separately. Hence, whereas the blades may have a relatively large chord in their use configuration, i.e. when mounted on the wind turbine, they may have a smaller chord in their transport configuration, when the main blade section(s) and the auxiliary blade section(s) are separate and hence may be transported separately.

Generally, the auxiliary blade section is preferably arranged or configured such that any cross-sectional plane through the blade includes the chord of the main blade section as well as the chord of the auxiliary blade section. In other words, the chord plane of the auxiliary blade section is preferably also the chord plane of the main blade section.

Each auxiliary blade section is preferably configured and arranged such that it forms a leading edge slat or a trailing edge flap for the main blade section. Hence, the main blade section and the auxiliary blade section may provide a synergetic aerodynamic effect, as the auxiliary blade section in essence forms an extension of the main blade section at its leading and/or trailing edge. In embodiments of the invention, the main blade section comprises one single auxiliary blade section in the area of the leading edge and/or one single auxiliary blade section in the area of the trailing edge.

In one embodiment, in which the auxiliary blade section is provided as a pitchable trailing edge, a control system of the wind turbine may be configured to adjust the pitch at tower passage of the blade to ensure that no collision occurs. Alternatively, pitch of the auxiliary blade section may be limited to avoid tower collision. In a yet further alternative, as mentioned above, the trailing edge is fixed to the hub in a non-pitchable manner.

In the present context, the term 'pitch' or 'pitchable' includes the ability of a blade or blade section to rotate with respect to the hub section around an axis extending transversely to the main axis of the wind turbine in the longitudinal direction of the blades. The term 'yaw' or 'yaw angle' refers to the orientation of the rotor plane with respect to the oncoming wind. The yaw or yaw angle of the wind turbine is typically controllable by rotation of a nacelle, which supports the main axis, the rotor and other drive components such as gearbox and generator, relative to an upright tower of the wind turbine. The term 'angle of attack' refers to the angle between a reference line on the wind turbine blade or one of its sections, usually the chord line of an airfoil, and the vector representing the relative motion between the blade or blade section and the oncoming wind, i.e. the oncoming flow of air.

The term 'hub' designates a structural component, which interconnects the blades of the wind turbine to the main shaft. The hub hence transmits the driving torque of the rotor to the driving shaft of the main turbine, i.e. to the main shaft. In wind turbines comprising pitchable blades, the hub typically also comprises or houses the pitch-controlling mechanism for rotating the blades or the blade sections around their longitudinal axes. The hub may e.g. be made from cast iron, steel or a strong composite material capable of withstanding and transmitting the torque of the rotor to the main shaft. In most modern wind turbines, a cover, i.e. a so-called spinner, is provided for covering the hub. The spinner protects the hub from rain and dirt, it provides an aerodynamic surface for the wind flowing past the wind turbine, and it is also provided for aesthetical reasons. However, the spinner is not usually a torque-transmitting component like the hub.

The term 'main axis' should be understood as the axis of the main shaft of the wind turbine, i.e. that axis around which the rotor rotates during power-producing operation of the wind turbine. The main axis is normally aligned with the main wind direction, and the rotor plane is normally essentially orthogonal to the main axis. The driving torque of the blades is hence transmitted to the main shaft, which co-extends with the main axis.

It will be appreciated that the present invention is in particular concerned with improvements for so-called horizontal axis wind turbines (HAWT) with a main shaft and electrical generator at the top of a tower. The main axis is essentially horizontal, and the rotor plane is essentially vertical, though the main axis and as well the rotor plane may be tilted.

The invention of the first aspect of the invention is of particular interest at or near the root/hub section of the blade. At low radii, the flow velocity across the blade is relatively small compared to flow velocities at large radii, and hence lift is smaller. At larger radii, where flow velocities are high, auxiliary blade sections may not necessarily increase lift to a significant degree. Therefore, each of the auxiliary blade sections may preferably extend at most 40% of the radius of the rotor in a longitudinal direction of the blades, such as at most 30% or at most 20%, preferably with the auxiliary blade section being provided closer to a hub/root portion of the blade than to a tip portion thereof.

In a second aspect, the invention provides a method of controlling operation of a wind turbine with a rotor mounted on a hub section, the rotor comprising a plurality of blades and being rotatable around a main axis of the wind turbine, wherein the hub section is rotatable around a hub axis in fixed co-axial alignment with the main axis of the wind turbine, at least one of the blades of the rotor, preferably each of the blades of the rotor, comprising:

a pitchable main blade section, which is arranged to be driven by wind to rotate around the main axis;

an auxiliary blade section mounted to the hub section and arranged to be driven by wind to rotate around the main axis; wherein the auxiliary blade section is arranged in the area of a leading edge and/or of a trailing edge of the main blade;

the method comprising the steps of:

arranging the pitchable main blade section with a first angle of attack with respect to the oncoming wind;

arranging the auxiliary blade section with a second angle of attack with respect to the oncoming wind, which is different from said first angle of attack.

It will be appreciated that the wind turbine may include a wind turbine according to the first or third aspect of the invention.

During normal conditions, i.e. during power producing operation, the main blade section is usually pitched to a position, which confers lift. During abnormal conditions, e.g. at extreme wind speeds, the main blade section is pitched to a position, which does not confer lift, normally to a pitch angle of 90 degrees, i.e. to an idling position. Upon occurrence of a sudden extreme wind direction change, e.g. a change of wind direction close to 90 degrees, lift may unavoidably be conferred on the main blade section, as the pitch and yaw control system of the wind turbine only reacts with a time delay of some fractions of a second or even with a time delay of several seconds. Such lift may cause a torque around an axis, which does not coincide with the main axis of the wind turbine, and which is therefore undesirable. However, wind turbine blades and the blade supports must be built to structurally resist loads occurring in consequence of sudden extreme wind direction changes.

Embodiments of the second aspect of the invention reduce the undesired lift conferred on wind turbine blades at sudden extreme wind direction changes. Upon the occurrence of a sudden extreme change of wind direction, lift is possibly conferred on the main blade but not necessarily on the auxiliary blade section, which is at a different angle of attack to the oncoming flow than the main blade section. Hence, undesired loads, which may occur until the pitch and/or yaw control of the wind turbine have had time to react, can be reduced.

In other words, upon the occurrence of a sudden extreme change of wind direction, lift may be conferred on the main blade section. As discussed above, such lift is highly undesirable and may be harmful, as it provides a torque around an axis, which is transverse to the main axis of the wind turbine. However, at the same time, the change of wind direction results in a change of angle of attack on the auxiliary blade section, which results in a loss of lift on the auxiliary blade section. Hence, the undesirable/harmful lift on the blade is lower than if the main blade section and the auxiliary blade sections were pitched together.

Preferably, the yaw and/or pitch control of the wind turbine compensates for the wind direction change by bringing the rotor plane back to an essentially orthogonal orientation with respect to the wind direction. However, a certain time delay exists before the yaw control reacts, and during this time delay the individual pitch positions of the main and auxiliary blade sections results in a reduced lift and hence reduced torque.

It will hence be appreciated that the second aspect of the invention aims at controlling sudden transitions, in particular sudden changes of wind direction occurring, e.g. when the wind turbine is in an idling operation, in which the main blade section is pitched to an angle of approximately 90 degrees with respect to the oncoming flow. Generally, the first angle of attack may hence be an angle of attack, at which aerodynamic stall is achieved. The main blade section may hence be pitched positively or negatively, i.e. towards positions, in which either one of the suction side or the pressure side of the main blade section is pitched into the wind, with the oncoming wind striking the pressure or the suction side, respectively.

During idling operation of the wind turbine, the first angle of attack of the main blade section may be set, so that essentially no lift is conferred on the main blade section. Idling operation is typically desired when no power is to be produced, e.g. during maintenance, or during extreme wind conditions, such as during storms or hurricanes.

The second angle of attack of the auxiliary blade section may provide an aerodynamic lift on the auxiliary blade section, even when no lift is desired at the main blade section, for example during idling or periods of standstill. Such aerodynamic lift on the auxiliary blade section may be acceptable during idling, because it only provides a load driving torque around the wind turbine main axis. The benefit of such a configuration is that no or only reduced lift is conferred on the auxiliary blade section, upon the occurrence of an sudden extreme change of wind direction, which causes undesired lift on the main blade section. Hence unneeded lift on the auxiliary blade section occurring during idling may be accepted because such lift results in a driving torque around the wind turbine main axis, which the blades and their supports are dimensioned to withstand, and which therefore is harmless in a structural sense. The operational drawback of an unneeded lift on the auxiliary blade section occurring during idling can be accepted, as the wind turbine can be relatively easily stopped by a mechanical brake. Rotation of the rotor at low speed due to the lift on the auxiliary blade section may even be accepted during non-power producing operation. Further, the auxiliary blade section may, in the case it is provided in the form of a trailing edge flap, typically be arranged at least partially in the lee of the main blade section, and accordingly the unneeded or undesired lift conferred by the auxiliary blade section in the idling position may be negligible.

In other embodiments, the second angle of attack of the auxiliary blade section provides essentially no aerodynamic lift on the auxiliary blade section when the main blade section is at the first angle of attack, e.g. during idling. Accordingly the pitch of the auxiliary blade section can be controlled, so that stall is ensured during idling, i.e. the auxiliary blade section provides no lift during idling operation. Yet, the pitch of the auxiliary blade section may be such that, upon the occurrence of a sudden extreme wind direction change, no or only very limited lift is provided by the auxiliary blade section.

It will hence be appreciated that, generally, the first and second angles of attack may be set such that a sudden extreme change of wind direction increases the aerodynamic lift on one of the blade sections and reduces the aerodynamic lift on the other of the blade sections.

The auxiliary blade section may pitchable, in which case the step of arranging the auxiliary blade section with a second angle of attack with respect to the oncoming wind may comprise the step of pitching the second blade section. In alternative embodiments, the auxiliary blade section is fixed to the hub section in a non-pitchable manner.

In order to benefit form the auxiliary blade section at partial load of the wind turbine, and in order to protect the auxiliary blade section from high load during operation at nominal load, the wind turbine may be operated according to a partial load control scheme at velocities of the oncoming wind, at which the nominal output power of the wind turbine is not achievable, and the wind turbine may be operated according to a nominal control scheme at velocities of the oncoming wind, at which the nominal output power of the wind turbine is achievable. At conditions of partial load, the auxiliary blade section may be pitched to provide an aerodynamic lift, whereas at conditions of nominal load the auxiliary blade section may pitched to a non-lift generating position, or at least to a position, at which the lift conferred by the auxiliary blade section and hence the aerodynamic load thereon is negligible. Hence, the efficiency of the wind turbine may be improved by the auxiliary blade section at partial load, and yet the auxiliary blade section may be protected from high aerodynamic loads at higher wind velocities, i.e. at nominal power operation.

Experience has shown that gusts may in particular be harmful, if they occur at the transition of the power output curve from partial to nominal load. Hence, the auxiliary blade section may advantageously be protected further by pitching it to the non-lift generating position at wind velocities exceeding more than 90% or 95% of the wind velocity, at which the nominal power output is achievable, i.e. at wind velocities around 5-10% below the transition from partial load to nominal load.

In the present context, the nominal power output may be understood as the maximally desired power output of a given wind turbine, that is an output power level, which is normally not exceeded, even if the wind velocity would render a higher power output possible. Hence, once the wind velocity is sufficiently high to achieve the nominal power output, the wind turbine is controlled, e.g. by pitching the blades, to limit the power output. At partial load, the wind velocities are not sufficient to achieve the nominal power output.

In a third aspect, the present invention provides a wind turbine blade comprising a main blade section and at least one leading edge slat, which extends at most 40% of the radius of the rotor in a longitudinal direction of the blade. The leading edge slat may be provided closer to a hub portion of the blade than to a tip portion thereof. The leading edge slat may be deployed to allow the blade to operate at a higher angle of attack and hence to increase lift, which is of particular interest at or near the hub/root section of the blade i.e. at low radii where flow velocity is relatively small. The leading edge slat is preferably arranged or configured such that any cross-sectional plane through the blade includes the chord of the main blade section as well as the chord of the leading edge slat. The chord plane of the leading edge slat is accordingly preferably also the chord plane of the main blade section. The leading edge slat may be pitchable or non-pitchable. In respect of leading edge slat, the risk of tower collision is normally of no concern, and hence the leading edge slat may be provided to pitch with the main blade section. In other embodiments, the slat may however be pitchable independently from the main blade section or mounted to the hub in a fixed, non-pitchable way. In embodiments, in which the slat is to pitch with the main blade section in all operational conditions, or in respect of non-pitchable stall-controlled wind turbines, the slat may be mounted to the main blade section, e.g. by fixed supports.

The invention also provides a wind turbine with a rotor comprising a plurality of blades, at least one of which, preferably all of which is a blade according to the third aspect of the invention.

The below description applies to all aspects of the invention.

The auxiliary blade sections, i.e. leading edge slats and/or trailing edge flaps may be mounted to the hub or main blade section by fixed supports. In alternative embodiments, they may be movable, e.g. pitchable and/or movable in the chord direction, so that the may be retracted at certain flow field conditions, such as e.g. high wind speeds.

The effect achieved by slats and flaps when deployed is that the blades are allowed to operate at higher angles of attack and to increase lift, as the stalling speed is reduced. The leading edge slats and/or trailing edge flaps may be provided as slotted slats or flaps, respectively. This brings about the additional benefit that air from the pressure side may flow through the slot and delay flow separation on the suction side. Hence, in the case of leading edge slats, a trailing edge of the leading edge slat may be arranged at a distance from a leading edge of the main blade section, so as to thereby provide a flow passage from a pressure side of the leading edge slat to a suction side of the main blade section. In the case of trailing edge flaps, a leading edge of the trailing edge flap may be arranged at a distance from a trailing edge of the main blade section, so as to thereby provide a flow passage from a pressure side of the main blade to a suction side of the trailing edge flap. The flow passage between the main blade section and the trailing edge flap and/or the leading edge slat may positively influence the aerodynamics of the blade. Specifically, the flow passage allows energy to be transmitted from the pressure side of the leading edge slat to the suction side of the main blade section, and/or form the pressure side of the main blade section to the suction side of the trailing edge flap. Thereby, flow separation, i.e. aerodynamic stall at the main blade section and/or of the trailing edge flap, respectively, may be avoided at a certain angle of attack, at which stall would otherwise occur. Hence, the flow passage allows the blade sections to be operated at slightly higher angles of attack than if no such flow passages were present.

The provision of an auxiliary blade section, i.e. a leading edge slat and/or a trailing edge flap near the root of the blade, i.e. near the hub, may provide additional aerodynamic lift to the inner part of the blade. Due to the fact that it is normally desired to provide the innermost part of the main blade section, i.e. that part which is to be connected to the hub, with a circular cross-section, the root part of the main blade section normally provides a gradual transition from a lift-generating airfoil shape when seen in cross section to a circular cross section. This transition compromises aerodynamic lift. The auxiliary blade section may, however, confer lift to the blade near the hub to thereby increase the efficiency of the wind turbine to at least partially compensate for the loss of lift conferred by the aforementioned transition.

The number of leading edge slats and/or trailing edge flaps (auxiliary blade sections) may be selected such that each of the main blades has one and only one leading edge slat and/or one and only one trailing edge flap. In other embodiments, the number of leading edge flaps and/or trailing edge flaps (auxiliary blade sections) may be selected such that each of the main blades has a plurality of leading edge slats and/or a plurality of trailing edge flaps. For example, several slats or flaps may be provided at various radii along the length of the main blade section.

A chord of the leading edge slat and/or trailing edge flap may extend essentially in continuation of a chord line of the main blade section. However, in order to enhance the aerodynamic benefits of the slats and/or flaps, a chord line of each of the leading edge slats and/or trailing edge flaps may be vertically offset from a chord line of respective one of the main blade sections, when seen in cross section perpendicular to a longitudinal axis of the main blade section.

In order to delay flow separation and/or increase lift, vortex generators may be provided at the suction side of the main blade section, or the leading edge slats and/or trailing edge flaps (auxiliary blade sections).

The main blade sections may have a blunt trailing edge along at least a part of their length, e.g. at low radii in the area of the trailing edge flaps. The thickness of the blunt trailing edge is preferably at least 1% of the chord of the main blade section, such as at least 2% or at least 5%. The blunt trailing edge may preferably be provided at radii of the blade, which have a thickness-to-chord ratio of at least 30%, such as at least 32%, at least 35%, at least 37%, at least 40% or at least 45%.

The leading edge slats and/or trailing edge flaps (auxiliary blade sections) are primarily intended for low radii portions of the blades, at which the thickness of the blades is relatively high, and where leading edge slats and trailing edge flaps have been found to have the most significant influence on aerodynamic lift. Hence, in certain embodiments of the invention, the leading edge slats and trailing edge flaps (auxiliary blade sections) are provided only at a part of the main blades, which have a thickness-to-chord ratio of at least 30%, such as at least 32%, at least 35%, at least 37%, at least 40% or at least 45%.

From the above summary of the invention, it will be appreciated that the invention generally provides a wind turbine with a rotor mounted on a hub section, wherein the rotor and hub section are rotatable around a main axis of the wind turbine, and wherein the rotor comprises a plurality of blades each comprising:

a main blade section;

an auxiliary blade section mounted to the hub section and arranged to be driven along with the main blade section;

wherein the auxiliary blade section in a direction of rotation of the rotor is arranged in front of a leading edge and/or behind a trailing edge of the main blade, so that each blade is thereby provided with a leading edge slat and/or a trailing edge flap formed by the auxiliary blade section to increase the planform area of the blade and increase aerodynamic lift.

BRIEF DESCRIPTION OF THE DRAWINGS

Embodiments of the invention will now be further described with reference to the drawings, wherein.

DETAILED DESCRIPTION OF THE DRAWINGS

Figures 1, 3:
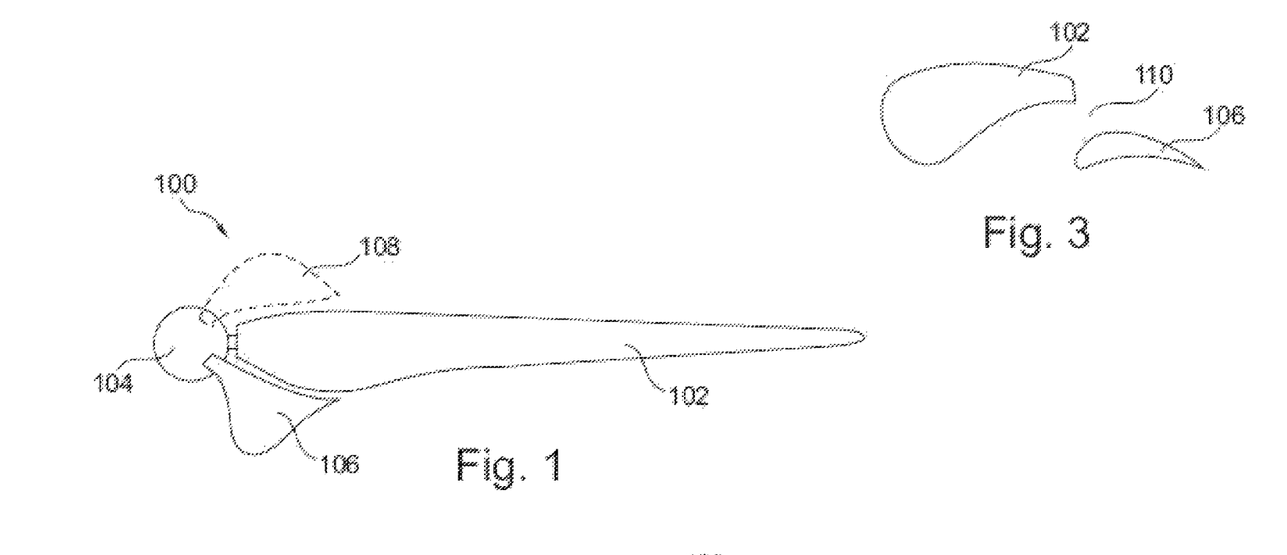
FIG. 1 shows a side view of a wind turbine according to the first and third aspects of the invention, including a blade with two auxiliary blade sections.
FIG. 3 is a cross-sectional view of an alternative blade configuration including a laterally offset trailing edge flap.
Figure 2:
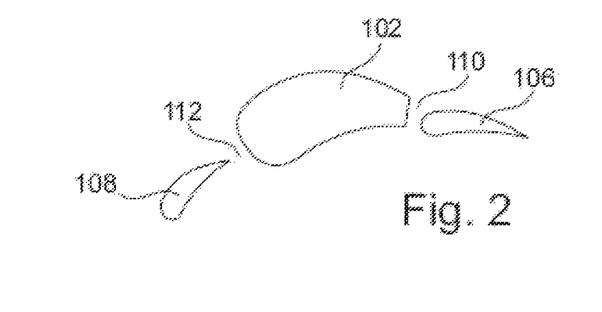
FIG. 2 is a cross-sectional view of the blade of FIG. 1.

FIG. 1 shows a side view of a wind turbine according to the first aspect of the invention, including a blade 100 with a main blade section 102 attached to a hub 104, and two auxiliary blade sections 106 and 108. The auxiliary blade section 106 is a trailing edge flap at the root/hub section of the blade, and auxiliary blade section 108 is a leading edge slat. The leading edge slat 108 is shown in dotted lines. As shown in FIG. 2, the trailing edge flap 106 and the leading edge slat 108 may be provided as slotted flaps and slats, respectively, with gaps 110 and 112 between the trailing edge of the main blade section 102 and the leading edge of the trailing edge flap 106, and between the trailing edge of the leading edge slat 108 and the leading edge of the main blade section 102. As shown, the main blade section 102 may have a blunt trailing edge facing the gap 110. FIG. 3 shows an embodiment, in which the trailing edge flap is offset by a lateral distance (vertical distance in the cross-sectional view of FIG. 3). Likewise, the leading edge slat may be vertically offset from the main blade section (not shown).

In FIG. 1, the leading edge slat 108 is attached to the hub 104. It may, however, be attached to the main blade section 102 with no direct connection to the hub 104.

It should be understood that the vertical and horizontal position of the flap 106 with respect to the main blade 102 when seen in cross section may vary along the length of the blade. Hence, for example at one radius the flap 106 may be arranged as shown in FIG. 2, whereas at a different radius it may be arranged as shown in FIG. 3.

Figures 4, 5:
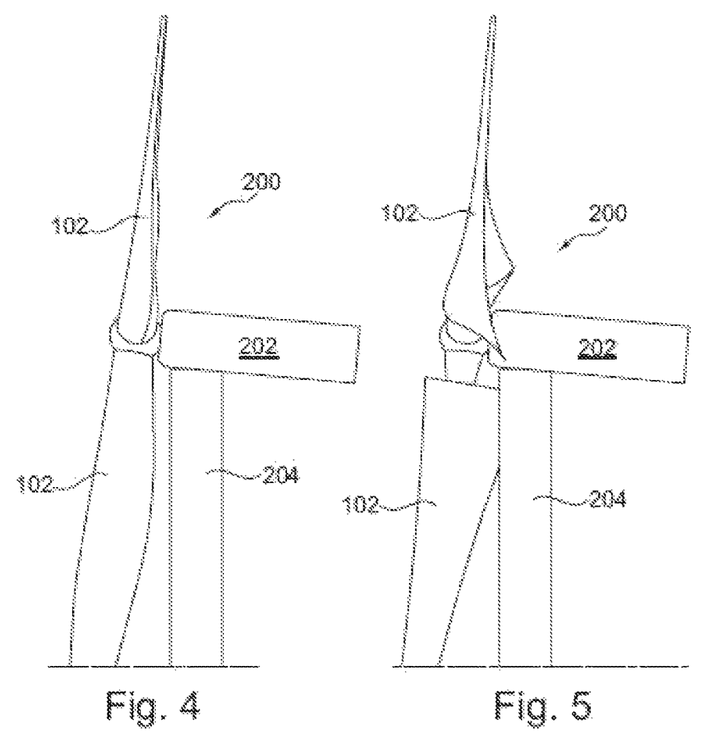
FIGS. 4 and 5 illustrate a wind turbine with pitchable blades.

FIGS. 4 and 5 illustrate a wind turbine 200 with pitchable blades. The wind turbine comprises a nacelle 202 including the drive train of the wind turbine and a power converter, e.g. a generator. In FIG. 4, the blade is provided with approximately zero pitch, and no risk exists that the blade collides with the tower 204. In FIG. 5, however, the blade is pitched to 90 degrees, and as shown those parts of the blade which have a large chord, i.e. blade portions near the root/hub of the blade, may collide with the tower 204. However, if the large-chord portions of the blade are provided as shown in FIG. 1, with a main blade section 102 and a trailing edge flap 106, the trailing edge flap 106 may be controllable in a way that avoids tower collision. For example, the trailing edge flap 106 may be fixed to the hub in a non-pitchable manner, or pitch of the trailing edge flap 106 may be controllable independently from the pitch control of the main blade section 102.

Figures 6A, 6B:
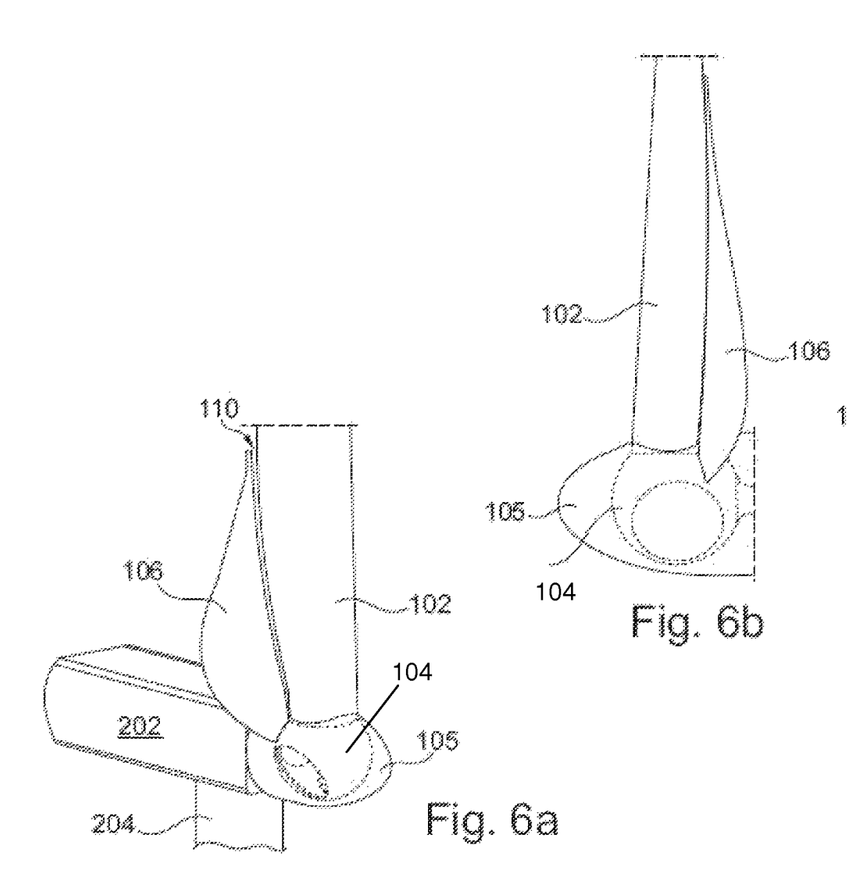
FIGS. 6a-6c illustrate a wind turbine according to the first aspect of the invention, including a trailing edge flap.
Figure 6C:
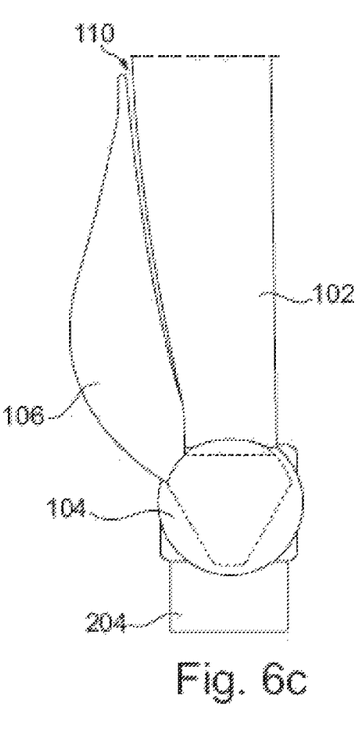
Figure 7:
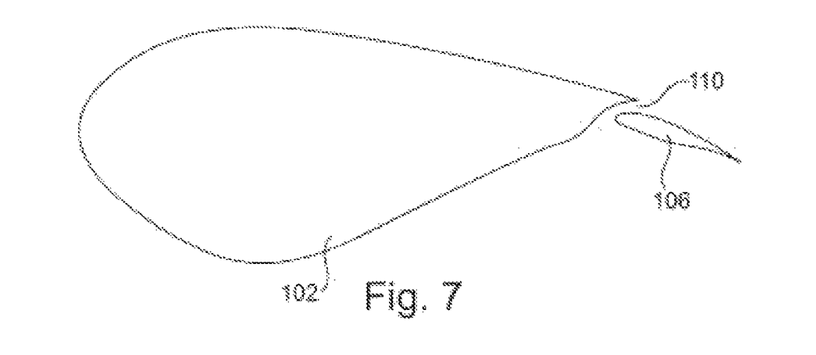
FIG. 7 illustrates cross-sectional view of a slotted trailing edge flap.

FIGS. 6a-6c are illustrations of a wind turbine according to the first aspect of the invention, including the main blade section 102 and a slotted trailing edge flap 106. The hub is covered by a spinner 105, and the trailing edge flap 106 is mounted in fixed, non-pitchable manner to the hub 104. FIG. 7 illustrates a cross-sectional view of a slotted trailing edge flap 106.

Figures 8, 9:
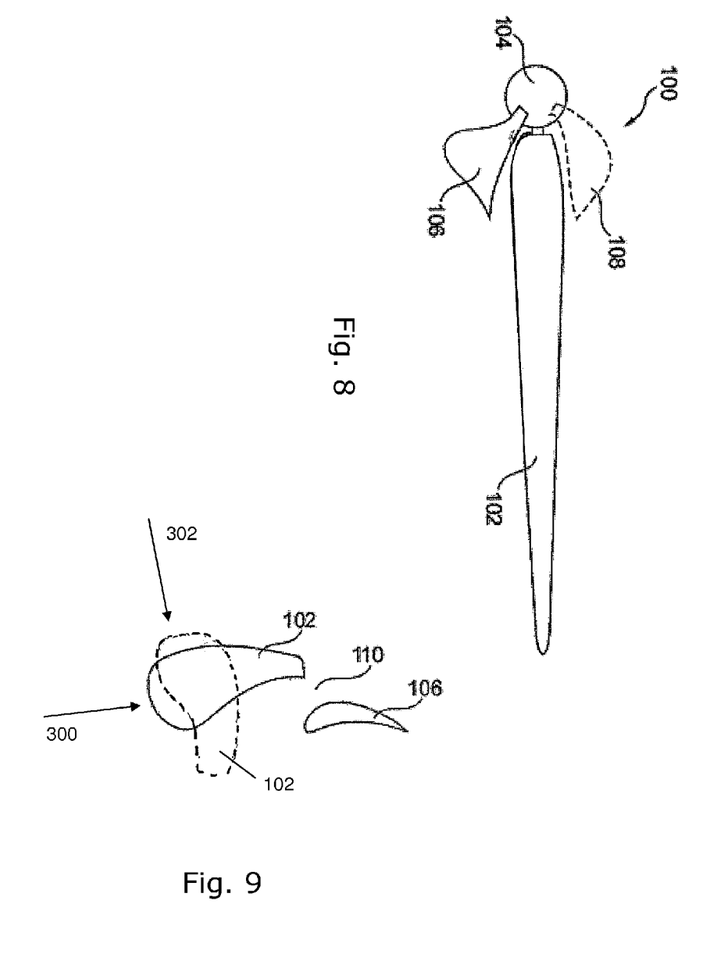
FIGS. 8 and 9 illustrate cross-sectional and side views, respectively, of a blade operated in accordance with the second aspect of the invention.

FIGS. 8 and 9 illustrate cross-sectional and side views, respectively, of a blade operated in accordance with the second aspect of the invention. In FIGS. 8 and 9, the main blade section 102 is pitched approximately 90 degrees relative to the auxiliary blade sections, i.e. relative to the trailing edge flap 106 and the leading edge slat 108. FIG. 8 only shows the pitched position of the main blade section 102, whereas FIG. 9 shows the 90 degrees pitched position of the main blade section 102 in dotted lines and an operating position of the main blade section 102 in full line. The operating position should be understood to be a pitch position, in which the angle of attack is such that lift is conferred on the main blade section to result in a driving torque around the wind turbine main axis.

When the main blade section 102 is in its pitched position as shown in dotted lines in FIG. 9, and the auxiliary blade section 106 is kept in its orientation shown in FIG. 9, the main blade section forms a first angle of attack with respect to the oncoming wind 300 of approximately 90 degrees, and the auxiliary blade section 106 forms an angle of attack of approximately 10 degrees in the example shown.

The 90 degrees pitched position shown in FIG. 8 and in dotted lines in FIG. 9 is an idling position, in which the oncoming wind represented by arrow 300 does not provide any lift on the main blade section. Hence, essentially no power is produced by the wind turbine in this configuration. It will be understood that, when the main bladed section is in the position shown in dotted lines FIG. 9, the trailing edge flap 106 is in the lee of the main blade section 102. Hence, the trailing edge flap 106 only provides a minimal degree of lift and hence a low or even negligible driving torque on the main axis.

When the main blade section 102 is in the idling position shown in dotted lines in FIG. 9, a sudden extreme change of wind direction, for example a change to the direction shown by arrow 302 in FIG. 9, will result in an aerodynamic lift on the main blade section 102 and hence in an undesired, but yet unavoidable torque load around an axis transverse to the main axis. However, in that case, the trailing edge flap will, in that circumstance, provide no lift. Hence, the total torque around the transverse axis is lower than if the trailing edge flap 106 would have been pitched together with the main blade section 102.

The invention claimed is:

1. A wind turbine, comprising:
a hub section configured to be rotatable about a hub axis; and
a rotor mounted on the hub section and including a plurality of blades, the rotor configured to be rotatable about a main axis of the wind turbine, and the hub axis being in fixed, co-axial alignment with the main axis of the wind turbine, wherein at least one of the blades of the rotor further comprises:
a main blade section having a leading edge and a trailing edge and configured to be driven by wind to rotate around the main axis, wherein the main blade section has a blunt trailing edge; and
at least first and second auxiliary blade sections configured to be driven by wind to rotate around the main axis, the second auxiliary blade section being separate from the first auxiliary blade section, wherein the at least first and second auxiliary blade sections are arranged in the area of at least one of the leading edge and trailing edge of the main blade section,
wherein the at least first and second auxiliary blade sections are directly mounted to the hub section and are configured to increase the planform area of the blade and increase aerodynamic lift, the first auxiliary blade section being configured to form a leading edge slat for the main blade section and the second auxiliary blade section being configured to form a trailing edge flap for the main blade section.

2. The wind turbine according to claim 1, wherein the main blade portion has a length and the at least one auxiliary blade section extends along a portion of the length of the main blade section.

3. The wind turbine according to claim 1, wherein the thickness of the blunt trailing edge is at least 2% of the chord of the main blade section.

4. A wind turbine, comprising:
a hub section configured to be rotatable about a hub axis; and
a rotor mounted on the hub section and including a plurality of blades, the rotor configured to be rotatable about a main axis of the wind turbine, and the hub axis being in fixed, co-axial alignment with the main axis of the wind turbine, wherein at least one of the blades of the rotor further comprises:
a main blade section having a leading edge and a trailing edge and configured to be driven by wind to rotate around the main axis; and
at least one auxiliary blade section configured to be driven by wind to rotate around the main axis, wherein the at least one auxiliary blade section is arranged in the area of at least one of the leading edge and trailing edge of the main blade section,
wherein the at least one auxiliary blade section is directly mounted to the hub section and is configured to form a leading edge slat or a trailing edge flap for the main blade section to increase the planform area of the blade and increase aerodynamic lift, and
wherein the main blade section forms at least a portion of the outer surface of the at least one blade along substantially the full length of the at least one auxiliary blade section.

5. The wind turbine according to claim 4, wherein no portion of the at least one auxiliary blade section fully encompasses the main blade section.

6. The wind turbine according to claim 4, wherein no portion of the main blade section lies within the perimeter of the at least one auxiliary blade section.

7. The wind turbine according to claim 4, wherein the at least one auxiliary blade section is mounted to the hub section in a non-pitchable manner.

8. The wind turbine according to claim 4, wherein the at least one auxiliary blade section extends at most 40% of the radius of the rotor in a longitudinal direction of the blades.

9. The wind turbine according to claim 8, wherein the leading edge slat or trailing edge flap is provided closer to a hub portion of the rotor than to a tip portion thereof.

10. The wind turbine according to claim 8, wherein each auxiliary blade section extends at most 30% of the radius of the rotor in a longitudinal direction of a respective blade.

11. The wind turbine according to claim 10, wherein each auxiliary blade section extends at most 20% of the radius of the rotor in a longitudinal direction of a respective blade.

12. The wind turbine according to claim 4, wherein main blade section has one and only one leading edge slat and/or one and only one trailing edge flap.

13. The wind turbine according to claim 4, wherein a chord line of each of the at least one leading edge slats and trailing edge flaps is vertically offset from a chord line of a respective one of the main blade section, when seen in cross section.

14. The wind turbine according to claim 4, further comprising vortex-generating structure on a suction side of the at least one auxiliary blade section.

15. The wind turbine according to claim 4, wherein the at least one auxiliary blade section forms the leading edge slat, and wherein a trailing edge of the leading edge slat is arranged at a distance from a leading edge of the main blade section so as to thereby provide a flow passage from a pressure side of the leading edge slat to a suction side of the main blade section.

16. The wind turbine according to claim 4, wherein the at least one auxiliary blade section forms the trailing edge flap, and wherein a leading edge of the trailing edge flap is arranged at a distance from a trailing edge of the main blade section so as to thereby provide a flow passage from a pressure side of the main blade section to a suction side of the trailing edge flap.

17. The wind turbine according to claim 4, wherein the at least one auxiliary blade section is provided only at a part of the main blade section which has a thickness-to-chord ratio of at least 30%.

18. A method of controlling operation of a wind turbine having a hub section rotatable about a hub axis, and a rotor mounted on the hub section and including a plurality of blades rotatable around a main axis of the wind turbine, at least one of the blades of the rotor comprising a pitchable main blade section and an auxiliary blade section directly mounted to the hub section, the main and auxiliary blade section arranged to be driven by wind to rotate around the main axis, the auxiliary blade section configured to form a leading edge slat or a trailing edge flap for the main blade section, the method comprising:

arranging the pitchable main blade sections with a first angle of attack with respect to oncoming wind; and arranging the auxiliary blade section with a second angle of attack different from the first angle of attack with respect to the oncoming wind.

19. The method according to claim 18, further comprising achieving aerodynamic stall at the first angle of attack of the pitchable main blade section.

20. The method according to claim 18, further comprising setting the first angle of attack of the main blade section such that essentially no lift is conferred on the main blade section during idling operation of the wind turbine.

21. The method according to claim 20, further comprising setting the second angle of attack of the auxiliary blade section so as to provide an aerodynamic lift on the auxiliary blade section during idling operation of the wind turbine.

22. The method according to claim 20, further comprising setting the second angle of attack of the auxiliary blade section such that essentially no lift is conferred on the auxiliary blade section during idling operation of the wind turbine.

23. The method according to claim 18, further comprising setting the first and second angles of attack such that a sudden extreme change of wind direction increases the aerodynamic lift on one of the main or auxiliary blade sections and reduces the aerodynamic lift on the other of the main or auxiliary blade sections.

24. The method according to claim 18, wherein the auxiliary blade section is pitchable, and wherein the step of arranging the auxiliary blade section with a second angle of attack with respect to the oncoming wind comprises pitching the auxiliary blade section.

25. The method according to claim 24, further comprising:
operating the wind turbine according to a partial load control scheme at velocities of the oncoming wind at which the nominal output power of the wind turbine is not achievable;
operating the wind turbine according to a nominal control scheme at velocities of the oncoming wind at which the nominal output power of the wind turbine is achievable;
pitching the auxiliary blade section to provide an aerodynamic lift in conditions of partial load; and
pitching the auxiliary blade section to a non-lift generating position in conditions in which nominal load is achievable.

26. The method according to claim 25, further comprising pitching the auxiliary blade section to the non-lift generating position at wind velocities exceeding more than 95% of the wind velocity at which the nominal power output is achievable.

27. The method according to claim 18, wherein the main blade section forms at least a portion of the outer surface of the at least one blade along substantially the full length of the at least one auxiliary blade section.

28. The method according to claim 18, wherein the main blade portion has a length and the at least one auxiliary blade section extends along a portion of the length of the main blade section.

* * * * *